June 14, 1932.  K. HANSTAD  1,863,113
POTATO HARVESTING MACHINE
Filed Oct. 15, 1928
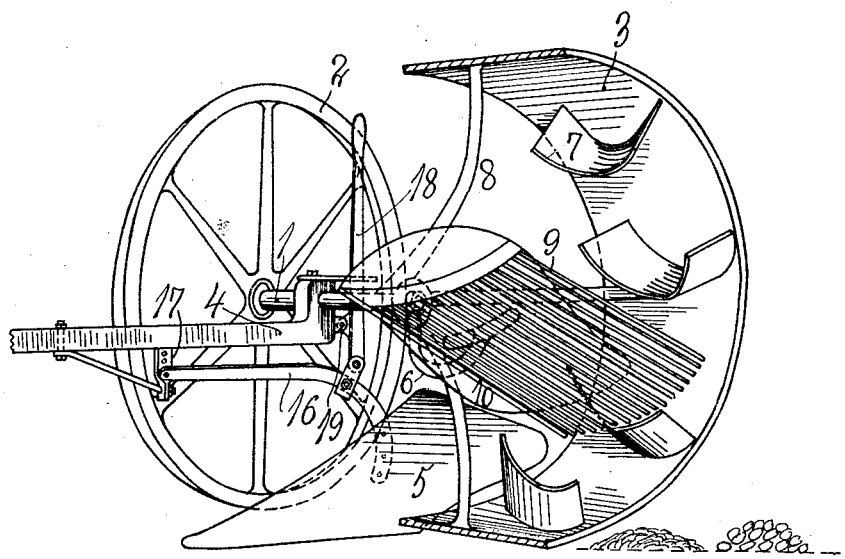
K. Hanstad
INVENTOR
By Marks & Clerk
Attys.

UNITED STATES PATENT OFFICE

KAARE HANSTAD, OF LILLEHAMMER, NORWAY

POTATO HARVESTING MACHINE

Application filed October 15, 1928, Serial No. 312,725, and in Norway August 10, 1928.

My invention relates to potato harvesting machines and has for its object to create a simple and efficient construction of such apparatus.

Generally potato harvesting machines consist of two main parts, a plow-share, serving to lift the potatoes together with the earth above the ground, and an apparatus serving to sift the earth from the potatoes in such a manner that the latter will be left on the ground or delivered in a box, carried by the machine. It is usual, in order to effect this separation of the potatoes from the earth, to make use of a lifting apparatus which may be so constructed that the earth is shaken off from the potatoes while these are lifted, or it may be so constructed that the potatoes together with the earth are delivered to the grate or sieve by which the separation is effected.

One of the objects of my invention is to simplify the apparatus by making use of one of the wheels of the machine as a lifter for the mass loosened by the plow-share, and this is effected by providing on the inside of the wheel-rim a number of scoops, which scoops take the mass towards the top of the wheel, letting the mass slide off so that it falls down on the grating arrangement at a lower level. In this manner the machine can be constructed without application of any movable parts so that the machine is very easily kept in order.

In the drawing I have shown a suitable form of carrying out my invention, the drawing showing a perspective view of the machine, part of the lifting wheel being broken away for the purpose of showing the parts inside the wheel.

The machine illustrated in the drawing is provided with an axle 1, having a running wheel 2 and a lifting wheel 3. 4 is the beam of the machine, to which beam the plow-share 5 is secured by way of a system of arms which may be arranged in the usual way, so that the plow-share may be easily adjusted. In the drawing the plow-share is carried by the arm 16, the latter being secured to the beam by means of a hanger 17, provided with holes, so that the fulcrum of the arm 16 can be adjusted in different heights. A lever 18, having its fulcrum at 19 and being connected with the arm 16, serves to lift or lower the plow-share, as it may be desirable.

The lifting wheel 3 is provided on its inner side with scoops 7. The spokes 8 of this wheel have a curved form so that the grating 9 can extend inwardly without coming into collision with the spokes, when the wheel is rotating. This grating 9 extends laterally outside of the lifting wheel. Underneath the grating 9 is provided an apron 10 which is shorter than the grating, and this apron is carried by the axle of the machine by means of the bracket 6, and the grating is fixed to this apron.

When the machine works, the plow-share 5 turns the earth and the potatoes in the same into the lifting wheel. The scoops of the lifting wheel lift the mass and let it fall down on the grating 9. The earth passes through the grating and falls on the apron 10, while the potatoes roll off from the grating and may be taken up from the ground where they will be assembled in a long row.

Claim:—

In a machine for harvesting agricultural products, a pair of running wheels mounted on an axle therebetween, both of which are in operative contact with the surface of the ground, one of which wheels is a lifting wheel having lifting means for elevating vegetables and earth thereon, an inclined transverse grating on the axle, one end of which extends beyond the outside edge of the rim of the lifting wheel, for depositing the separated vegetables in a longitudinal row outside the path of the machine; in combination with an adjustable ploughing means, and an apron of shorter length than the grating, positioned beneath the latter for collecting débris therefrom.

In testimony whereof I have signed my name unto this specification.

KAARE HANSTAD.